United States Patent

Barn

Patent Number: 5,953,348
Date of Patent: Sep. 14, 1999

[54] MULTIPLE CHANNEL TERMINAL SERVER COMMUNICATIONS NETWORK

[75] Inventor: Belwinder Singh Barn, Burnaby, Canada

[73] Assignee: International Business Machines Corp., Armonk, N.Y.

[21] Appl. No.: 08/899,831

[22] Filed: Jul. 24, 1997

Related U.S. Application Data

[63] Continuation of application No. 08/309,774, Sep. 21, 1994, abandoned.

[51] Int. Cl.$^6$ .................................................. H04J 1/00
[52] U.S. Cl. ........................ 370/480; 370/486; 370/468; 370/489
[58] Field of Search .................................. 370/485, 486, 370/487, 489, 490, 480, 449, 450, 451, 346, 349, 467, 468; 455/3.1, 5.1, 6.1, 6.3; 340/825.08

[56] References Cited

U.S. PATENT DOCUMENTS

| | | | |
|---|---|---|---|
| 4,534,024 | 8/1985 | Maxemchuk et al. | 370/485 |
| 5,084,903 | 1/1992 | McNamara et al. | 370/485 |
| 5,272,700 | 12/1993 | Hansen et al. | 370/485 |
| 5,276,908 | 1/1994 | Koohgoli et al. | 455/62 |
| 5,404,137 | 4/1995 | Levien | 340/825.07 |
| 5,428,667 | 6/1995 | Easterling et al. | 379/34 |

*Primary Examiner*—Ajit Patel

[57] ABSTRACT

A network of terminals and a server linked by a communications medium, comprising a device for assigning a selected one of a plurality of downstream frequency channels for transferring information from the server to the terminals and a selected one of a plurality of upstream frequency channels for transferring information from each of the terminals and the server.

20 Claims, 1 Drawing Sheet

MULTIPLE CHANNEL TERMINAL SERVER COMMUNICATIONS NETWORK

This application is a continuation of application Ser. No. 08/309,774, filed Sep. 21, 1994, now abandoned.

FIELD

The present invention relates to a network for transmitting information among a plurality of terminals and a server.

BACKGROUND

There are a host of transmission systems which share the media for the transmission of information among a number of terminals and a server ranging from a satellite and ground stations, local and wide area networks, cable television networks and telephone networks. In an unshared communications medium, communication from the server to the terminals is affected by the server simply transmitting its data to the terminals in some systematic manner to ensure that data for each terminal is transmitted at some time. Conflict does not result since the server is the only initiator of data traffic in the server to terminal direction. This broadcasted data is available to all terminals. However, with the shared medium only one terminal may transmit to the server at any given instant in time. Various protocols have been developed to deal with this problem.

A protocol called ALOHA allows a terminal to transmit at will and retransmit if contention was detected. The transmitting terminal also has a receiver which simultaneously receives and analyzes the signal on the medium. If no other signal is present other than the one it is transmitting then no contention is present. But if the received signal is different than the one being transmitted then one or more other terminals are placing their transmission on the shared medium at the same time and contention is present. Each terminal retransmits with a different delay so that contention tends to be avoided amongst the terminals that were simultaneously transmitting. Variable delays, unpredictable response times, and low band width utilization of the medium are the drawbacks of this technique. Refinements, such as "slotted ALOHA" which alters the way retransmission is attempted, improve the channel utilization but delays are still variable. A polling protocol on the "slotted ALOHA" attempts to allows equal access to all terminals with predictable but longer delays and at the expense of lower utilization.

In satellite networks, Frequency Division Multiple Access (FDMA) is employed by which each terminal is assigned a unique frequency. This technique assists in overcoming the confusion problem due to contention but is still characterized by low utilization of the medium.

Are Accordingly, it is an object of the invention to provide an improved network for transmission of data amongst a plurality of terminals and a server. It is a further object of the invention to provide a solution that minimizes delays for real-time information. It is a further object to provide a network that has predictable delays for time sensitive information. It is yet a further object of the invention to provide a network that minimizes functionality requirements of a terminal while optimizing the cost/performance ratio.

SUMMARY OF THE INVENTION

According to the invention there is provided a network of terminals and a server linked by a communications medium, comprising means for assigning a selected one of a plurality of downstream channels for transferring information from the server to the terminals and a selected one of a plurality of upstream channels for transferring information from each of the terminals to the server.

Preferably, each of said terminals can transmit on a plurality of the upstream channels and each can receive from a plurality of the downstream channels.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
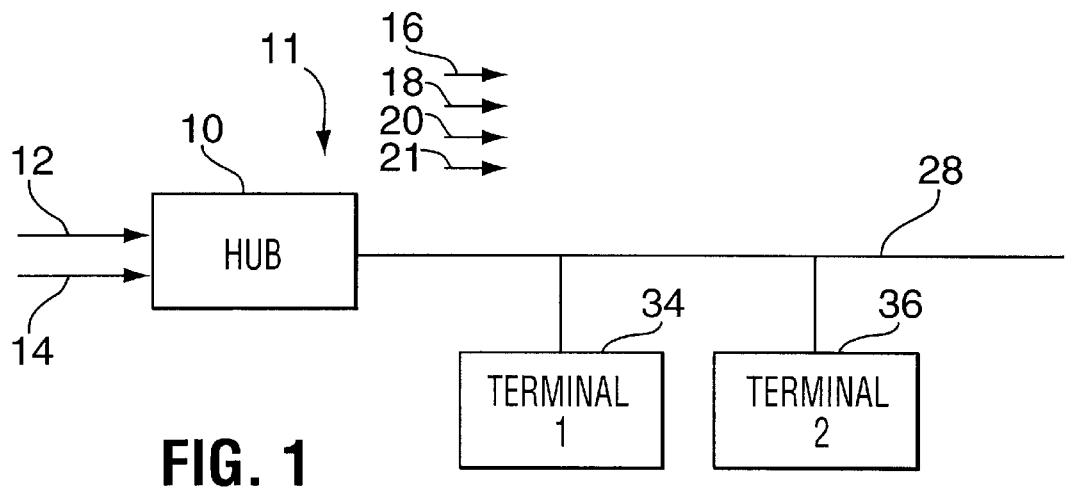
FIG. 1 is a schematic diagram of a cable distribution network.

Referring to FIG. 1 there is shown a conventional cable distribution network 11 having a hub 10 into which a number of cable lines 12 and 14 terminate. The hub 10 retransmits signals from the lines 12 and 14 on line 28 to a number of terminals of which 34 and 36 are two. Line 28 carries a number of downstream channels 16, 18, 20 and 21 of distinct frequency bands. Each terminal 34, 36 selects a particular channel as determined by users at those terminals 34, 36.

Figure 2:
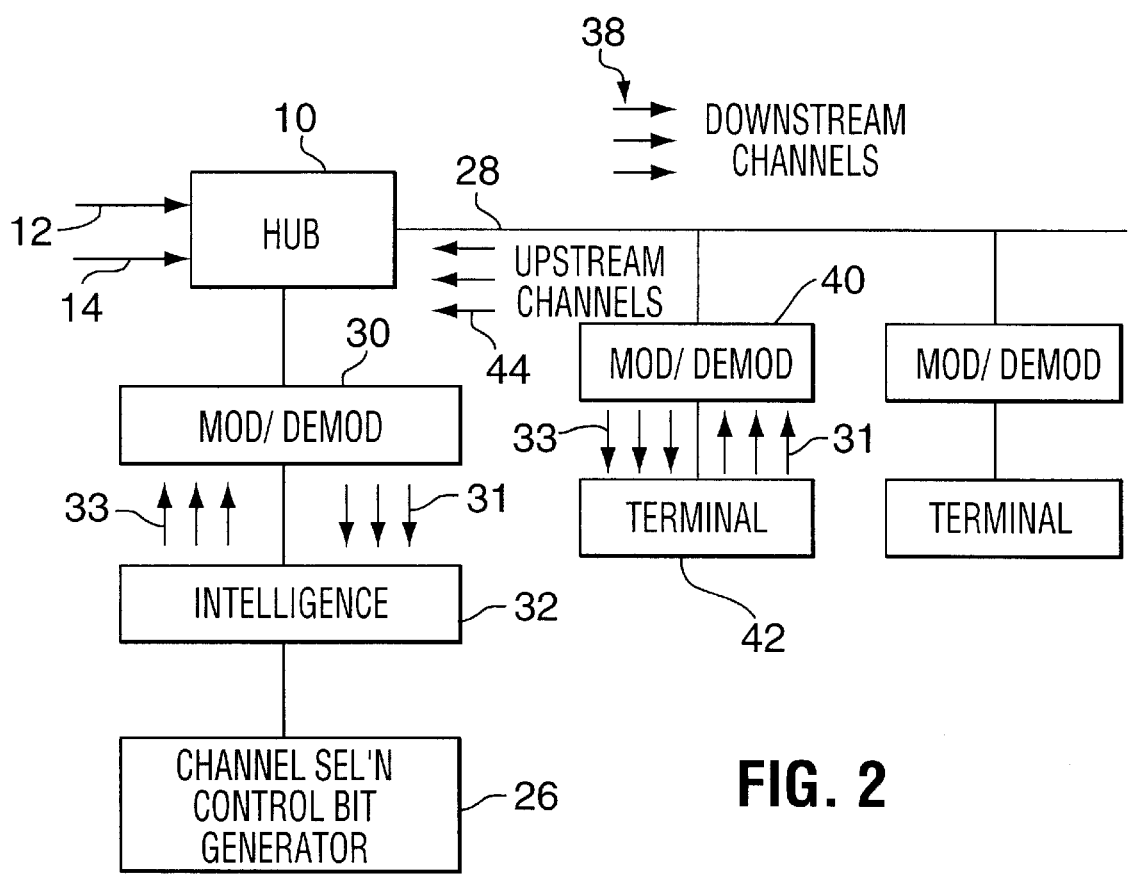
FIG. 2 is a schematic diagram of a cable distribution network showing one of several terminals having an idle channel and other channels which can be assigned by the server to any one of the plurality of terminals in response to request by that terminal.

Referring to FIG. 2 there is coupled to the hub 10 through a modulator/demodulator 30 an intelligence system 32 acting as server. The server 32 sends to the modulator/demodulator "D" downstream bit streams 33 and receives "U" upstream bit streams 31. A typical terminal 42 is coupled to line 28 through modulator/demodulator 40. Terminal 42 also receives "D" downstream bit streams 33 and sends on selected ones of "U" upstream bit streams 31. Modulator in modulator/demodulator 30 modulates each downstream bit stream 33 with an RF carrier with a frequency assigned to that bit stream and the modulator in modulator/demodulator 40 modulates each upstream bit stream 31 with an RF carrier of a frequency assigned to that bit stream. After modulation, upstream bit streams 31 are carried in "U" upstream channels 44 with each channel having distinct frequency bands and the downstream bit streams 33 are carried downstream in channels 38 also with distinct frequency bands. Each channel is assigned a communication protocol such as ALOHA, POLLING, etc., to meet the particular objectives of the environment in which the system is used.

The demodulator in modulator/demodulator 30 detects the modulated carrier for each upstream channel 44 and the demodulator of modulator/demodulator 40 detects the modulated carrier for each downstream channel 38. A source (not shown) in the terminal 42 is able to transmit on any one of the "U" channels. The number of channels and the bandwidth of each upstream and downstream channel can be selected to provide the best cost/performance ratio for the given application. One of the upstream channels "U" and one of the downstream channels "D" are selected for use by a particular terminal or terminals for communicating with the server 32. The terminal and server 32 establish which of the "U" upstream and "D" downstream channels that terminal should use for communicating with the server 32 and which channels are to be default channels. Once a request has been received from a terminal in one of the upstream channels reserved for communication with that terminal and usually other terminals as well, the server 32 analyzes the request. A channel selection control bit generator 26 shown in FIG. 2, and which is in reality a part of the server 32, generates the control bits which identify the terminals to receive the communication and which cause those terminals to be conditioned to accept and process information on selected downstream channels and to transmit on selected upstream channels. The characteristics of the communication channels are defined by selecting a communication protocol such as ALOHA, POLLING, TDMA, etc. The number of terminals using any one channel are limited to maintain the desired characteristics of the communications channel such as minimum delay, deterministic delay, etc.

The foregoing idea can be illustrated by way of an example network. With several terminals coupled to line 28 each terminal can be in one of the following states (other states could be defined as required):

(1) Unpowered
(2) Idle
(3) Generating events at a rate of few per hour
(4) Generating information for the server at a rate of an event every few seconds
(5) Real time data—tens of events per second An upstream communications channel is allocated for idle terminals. Terminals transmit on this channel at will, i.e. using the ALOHA protocol. The server or intelligence 32 rejects corrupted messages. If an idle terminal requires real-time transactions, that terminal transmits a request using the ALOHA protocol. The server 32 acknowledges the request thereby successfully completing a transaction. The server 32 has determined from the request that the terminal requires real-time transactions. The server 32 then assigns one of the time division multiple access (TDMA) upstream channels 44 to the terminal. The total number of terminals on this channel are only a small fraction of the total terminal population. When a terminal is turned ON or looses power, it recovers to an idle state. This ensures that the server 32 has control over which channel the terminal utilizes for communications at all times. A terminal requesting service for exchanging an event every few seconds is assigned to a polled channel. The polling rate is several hundred polls per terminal per second. Terminals putting in service requests only occasionally are polled once every second.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modification or embodiments as falling within the true scope of the invention.

I claim:

1. A network of terminals and a server linked by a communications medium, comprising: means for assigning a selected one of a plurality of downstream frequency channels for transferring information from the server to the terminals and a selected one of a plurality of upstream frequency channels for transferring information from each of the terminals to the server, said means for assigning coupled to said server such that said server has sole control over assignment of said downstream and upstream frequency channels, and wherein said server generates and transmits bits along selected ones of said downstream channels which bits condition selected ones of said terminals to accept and process information on selected downstream channels assigned by said bits, to transmit information on selected upstream channels assigned by said bits and to communicate with a communication protocol assigned by said bits.

2. A network according to claim 1, wherein each of said terminals can transmit data and requests on a plurality of the upstream channels and wherein each of said terminals can receive data and channel and communications protocol assignment bits from a plurality of said downstream channels.

3. A network of terminals and a server linked by a communications medium, comprising: a channel assignor coupled to said server and operative in conjunction with said server to assign a selected one of a plurality of downstream frequency channels for transferring information from the server to the terminals and a selected one of a plurality of upstream frequency channels for transferring information from each of the terminals to the server, said server and said channel assignor having sole control over assignment of said downstream and upstream frequency channels, and wherein said server and channel assignor generate and transmit bits along selected ones of said downstream channels which bits condition selected ones of said terminals to accept and process information on selected downstream channels assigned by said bits, to transmit information on selected upstream channels assigned by said bits and to communicate with a protocol assigned by said bits.

4. A network of terminals and a server linked by a communications medium, comprising: a channel assignor coupled to said server and operative in conjunction with said server to assign a selected one of a plurality of downstream frequency channels for transferring information from the server to the terminals and a selected one of a plurality of upstream frequency channels for transferring information from each of the terminals to the server, wherein said server has sole control over assignment of said downstream and upstream frequency channels and wherein each terminal and the server have access to information placed on the medium by any other terminal wherein each terminal can be authorized by said server to access a selected upstream channel so as to read information placed on that channel by another terminal.

5. A network according to claim 1, wherein the downstream channels are carried at base band or on one or more RF carriers.

6. A network of terminals and a server linked by a communications medium, comprising: a channel assignor coupled to said server and operative in conjunction with said server to assign a selected one of a plurality of downstream frequency channels for transferring information from the server to the terminals and a selected one of a plurality of upstream frequency channels for transferring information from each of the terminals to the server, and wherein said server has sole control over assignment of said downstream and upstream frequency channels and wherein said channel assignor is a channel selection control bit generator which generates channel selection control bits which the server transmits to the terminals to condition a selected terminal to process selected downstream channels and to transmit on selected upstream channels in response to a request for services from that selected terminal.

7. A network according to claim 1, wherein one upstream and one downstream channel is reserved for idle terminal communication with the server by each of the terminals.

8. A network according to claim 1, wherein said plurality of upstream frequency channels comprises: (i) at least one upstream channel allocated for idle terminals; and (ii) at least one upstream channel allocated for real-time transactions.

9. A network according to claim 8, wherein said plurality of upstream frequency channels comprises at least one polled channel.

10. A network according to claim 9, wherein said plurality of downstream frequency channels comprises at least one downstream channel allocated for real-time transactions.

11. A network according to claim 10, wherein said plurality of downstream frequency channels comprises at least one downstream channel allocated for polled transactions.

12. A network according to claim 11, wherein said communications medium comprises a cable distribution network.

13. A network according to claim 1, wherein said plurality of upstream frequency channels comprises: (i) at least one upstream channel allocated for idle terminals; and (ii) at least one upstream channel allocated for real-time transactions; and wherein said plurality of downstream frequency channels comprises at least one downstream channel allocated for real-time transactions.

14. A network according to claim 13, wherein said communications medium comprises a cable distribution network.

15. A network according to claim 1, wherein said plurality of upstream frequency channels comprises: (i) at least one upstream channel allocated for idle terminals; and (ii) at least one upstream channel allocated for real-time transactions; and (iii) at least one polled channel; and wherein said plurality of downstream frequency channels comprises: (i) at least one downstream channel allocated for real-time transactions; and (ii) at least one downstream channel allocated for polled transactions.

16. A network according to claim 15, wherein said communications medium comprises a cable distribution network.

17. A network according to claim 1, wherein said plurality of downstream frequency channels comprises: (i) at least one downstream channel allocated for real-time transactions; and (ii) at least one downstream channel allocated for polled transactions.

18. A network according to claim 1, wherein said communications medium comprises a cable distribution network.

19. A network according to claim 3, wherein said plurality of upstream frequency channels comprises: (i) at least one upstream channel allocated for idle terminals; and (ii) at least one upstream channel allocated for real-time transactions; and (iii) at least one polled channel; and wherein said plurality of downstream frequency channels comprises: (i) at least one downstream channel allocated for real-time transactions; and (ii) at least one downstream channel allocated for polled transactions.

20. A network according to claim 19, wherein said communications medium comprises a cable distribution network.

* * * * *